United States Patent
Yoon et al.

(10) Patent No.: US 9,556,042 B2
(45) Date of Patent: Jan. 31, 2017

(54) WATER SOFTENER HAVING TIMER CONTROL VALVE

(75) Inventors: Sung Hun Yoon, Seoul (KR); Joong Keun An, Seoul (KR); Won Tae Kim, Seoul (KR); Chun Ho Park, Seoul (KR)

(73) Assignee: WOONGJIN COWAY CO., LTD., Gongju-si (KR)

(*) Notice: Subject to any disclaimer, the term of this patent is extended or adjusted under 35 U.S.C. 154(b) by 894 days.

(21) Appl. No.: 13/643,505

(22) PCT Filed: Sep. 30, 2010

(86) PCT No.: PCT/KR2010/006688
§ 371 (c)(1),
(2), (4) Date: Dec. 3, 2012

(87) PCT Pub. No.: WO2011/136445
PCT Pub. Date: Nov. 3, 2011

(65) Prior Publication Data
US 2013/0068678 A1 Mar. 21, 2013

(30) Foreign Application Priority Data

Apr. 30, 2010 (KR) .................. 10-2010-0041099
Aug. 20, 2010 (KR) .................. 10-2010-0081066

(51) Int. Cl.
*C02F 1/42* (2006.01)
*F16K 31/48* (2006.01)

(52) U.S. Cl.
CPC .............. *C02F 1/42* (2013.01); *F16K 31/48* (2013.01); *C02F 2201/005* (2013.01)

(58) Field of Classification Search
None
See application file for complete search history.

(56) References Cited

U.S. PATENT DOCUMENTS 2,243,815 A * 5/1941 Griswold ............... C02F 1/42
 137/488
3,616,820 A * 11/1971 Fleckenstein .......... C02F 1/42
 137/624.13

(Continued)

FOREIGN PATENT DOCUMENTS

| CN | 1251317 A | 4/2000 |
|---|---|---|
| CN | 2729446 Y | 9/2005 |

(Continued)

OTHER PUBLICATIONS

Yoon et al., "Water Softener Having Timer Control Valve," Office Action mailed Jun. 18, 2012, for KR 10-2010-0081066, 17 pages.

(Continued)

*Primary Examiner* — Terry Cecil
(74) *Attorney, Agent, or Firm* — Seed IP Law Group LLP

(57) ABSTRACT

A water pressure regenerated type water softener including: a timer control valve having a valve control unit rotated by a timer spring and into which raw water is supplied; a plurality of conduits into which the raw water selectively flows under the control of the timer control valve; a regeneration tank communicating with a regeneration tank inlet conduit of the conduits; and a resin tank unit receiving regeneration water flowing from the regeneration tank and containing an ion exchange resin therein. The water softener can be operated in one of stop mode, soft water mode, raw water mode and regeneration mode under the control of the valve control unit. When regeneration mode is selected, the valve control unit rotates to stop mode by the timer spring after a preset amount of time has elapsed.

18 Claims, 13 Drawing Sheets

(56) References Cited

U.S. PATENT DOCUMENTS 5,069,779 A * 12/1991 Brown .................. C02F 1/42
210/143
5,735,461 A 4/1998 Winther
7,563,362 B2 * 7/2009 Jeong .................. B01J 49/0086
210/143

FOREIGN PATENT DOCUMENTS

| JP | 2007244927 A | 9/2007 |
|----|--------------|--------|
| JP | 2007260518 A | 10/2007 |
| JP | 2008080220 A | 4/2008 |
| JP | 2009525173 A | 7/2009 |
| KR | 20-0364067 | 10/2004 |
| KR | 10-2005-0089678 A | 9/2005 |
| KR | 10-0875207 | 12/2008 |

OTHER PUBLICATIONS

International Search Report, mailed Jun. 29, 2011, for PCT/KR2010/006688, 2 pages.
Office Action, dated Sep. 11, 2013, for corresponding Chinese Patent Application No. 201080066679.4, 17 pages.
Office Action, dated Nov. 4, 2014, for corresponding Japanese Patent Application No. 2013-508968, 4 pages.

* cited by examiner (a)

(b)

(c)

WATER SOFTENER HAVING TIMER CONTROL VALVE

TECHNICAL FIELD

The present invention relates, in general, to a water pressure regenerated type water softener having a timer control valve and, more particularly, to a water pressure regenerated type water softener, which includes a timer control valve having a valve control unit rotated by a timer spring and receiving raw water, a plurality of conduits through which inlet raw water selectively flows under the control of the timer control valve, a regeneration tank communicating with a regeneration tank inlet conduit that is one of the plurality of conduits, and a resin tank unit to which regeneration water produced by the regeneration tank may be fed and which stores an ion exchange resin therein, wherein the water softener can execute a stop mode, a soft water mode, a raw water mode or a regeneration mode selected by manipulating the valve control unit and, when regeneration mode is selected, the valve control unit can be rotated for a preset time by the timer spring so as to execute the stop mode.

BACKGROUND ART

Generally, tap water (hard water) contains a large amount of chlorine used for water purification. In addition, due to factors, such as overage pipes or water pollution, tap water may contain various kinds of heavy metals (ions), such as iron, zinc, lead, mercury, etc. that have a negative influence on the human body. Although such tap water is not fatal to humans, when tap water directly contacts the skin of users, metal ions contained in water bond to fatty acids in soap and form metallic impurities. When such metallic impurities make contact with the skin of users they induce skin diseases, such as allergies, or promote skin aging.

To prevent these problems, various water softeners which change hard water into soft water using a method in which the calcium ions ($Ca^{2+}$) and magnesium ions ($Mg^{2+}$) of hard water are substituted for by sodium ions ($Na^+$), have been developed and used mainly for washing.

To realize such an ion exchange process, the water softener is provided with a resin tank containing ion exchange resins made of high molecular compounds containing sodium ions ($Na^+$), and a regeneration tank which contains ion exchange resin regeneration materials or regeneration agents, such as salt (NaCl) capable of producing sodium ions ($Na^+$) when dissolved in water.

Hard water passes through the resin tanks during the ion exchange process of the water softener. A large amount of ball-shaped ion exchange resins are stored in the resin tanks, and water comes into contact with these ion exchange resins in the resin tank and soft water is produced. As the ion exchange process is repeated, sodium ingredients ($Na^+$) are continuously removed from the ion exchange resins by continuous contact between the hard water and the ion exchange resins. Therefore, to regenerate sodium ingredients ($Na^+$) of the ion exchange resins, regeneration water having NaCl components is supplied from the regeneration tank to the resin tank.

Typically, when a user is aware through a variety of methods that the amount of sodium ingredients ($Na^+$) of the ion exchange resins has become reduced, the user makes the water softener start a regeneration process that supplies regeneration water. If the sodium ingredients of the ion exchange resins are successfully regenerated, the regeneration process can be terminated; however, it is difficult to clearly determine the appropriate regeneration process time.

To allow a user to determine the regeneration process time, in the related art, a gravity regenerated type water softener having a mechanical timer has been proposed. However, the water softener having the mechanical timer is problematic in that a user may not clearly know whether the current operation mode is regeneration mode or not. Further, even when the user knows that the current mode is regeneration mode, the user may not be aware of the remaining time for which regeneration should be executed.

In an effort to solve the problems, an electric timer or an electric signal controller may be provided in the water softener. However, the water softener is typically used in moist spaces, so that the electric timer or the electric signal controller may form a short circuit in the water softener and remarkably increase the production expenses of the water softener.

Further, the regeneration tank is typically provided with an openable cap for charging a regeneration agent into the tank. In the related art, raw water under pressure is contained in the regeneration tank, so that the interior of the regeneration tank is pressurized and it is difficult to open the cap because it is under pressure. Further, when the cap is opened, the cap may suddenly explode off due to the pressure and may injure a user.

To solve these problems, the conventional water pressure regenerated type water softener may be provided with a drain valve, which is opened to drain water from the regeneration tank and reduces the pressure inside the regeneration tank prior to opening the regeneration tank cap. However, the drain valve is typically located at a position that a user's hand cannot easily reach, thus being difficult to manipulate. Further, when a user carelessly opens the regeneration tank cap without opening the drain valve, the user may be injured by the exploding cap.

Further, the conventional water softener uses one resin tank, so that the water softener has a small size and may be easily installed in a desired place. However, when water at a temperature that was previously set by a user is supplied from a water tap to the water softener having one resin tank, the flow path of ion-exchanged soft water through which the soft water must pass prior to being distributed to the user is too long and an excessive amount of water stagnates in the flow path and does not move, so that an excessive amount of time is required to distribute the soft water at the temperature selected by the user.

In an effort to solve the problems, using two or more resin tanks in the water softener is possible. Although two or more resin tanks may realize easy control of the water temperature, they undesirably increase the size of the water softener, thus making installation of the water softener unfavorable.

Further, the conventional water softener does not allow a user to be aware of the total amount of distributed soft water, so that the user may not clearly determine the appropriate regeneration timing. To solve this problem, a flow sensor may be used in the water softener. However, the flow sensor may form an electric short circuit.

Further, in the related art, a water softener using an electric timer capable of producing an electric timer signal instead of a mechanical timer signal has been proposed. However, the water softener using the electric timer instead of the mechanical timer is problematic in that an electric short circuit may occur in the water softener because the water softener is typically used in moist environments as described above, and, further, the electric timer excessively increases the production cost of the water softener.

DISCLOSURE OF INVENTION

Technical Problem

Accordingly, the present invention has been made keeping in mind the above problems occurring in the related art.

In detail, the present invention is intended to provide a water softener, which uses a mechanical timer and can effectively inform a user of current operation mode, the state of progress of a regeneration mode and the remaining part of the regeneration mode using a mechanical mechanism.

Further, the present invention serves to provide a water softener, which can quickly produce soft water using raw water at a pre-controlled temperature supplied from a water tap according to the selection of a user and can quickly distribute the soft water to the user, and which has a small size and can be easily installed.

Further, the present invention serves to provide a water softener, which can solve the problems experienced when a regeneration tank cap is opened in the related art, and in which the regeneration tank cap can be easily and safely opened without injuring a user.

Further, the present invention serves to provide a water softener, in which, even when a multi-tank type resin tank unit comprising a plurality of resin tanks is used, the regeneration water can be evenly distributed to the resin tanks, so that the amount of ion exchange resin stored in the respective resin tanks can be maintained even.

Solution to Problem

In an aspect, the present invention provides a water softener, which uses a timer having a timer spring and is configured such that a timer handle can be actuated by the timer spring, thus informing a user of both the current operation mode and the progress of regeneration.

Further, the present invention provides a water softener, in which resin tanks are coupled to each other in parallel.

Further, the present invention provides a water softener, which includes a regeneration tank having both a shaft and a separator unit.

Described in detail, the present invention provides a water softener, which has a timer control valve receiving raw water. The timer control valve is rotatable by the timer spring.

It is preferred that the timer control valve be operated in one of regeneration mode and soft water mode.

The timer control valve may have a valve control unit, which is operable using the timer spring. The timer control valve may be operated in one of regeneration mode, soft water mode and stop mode and, when regeneration mode is selected, the valve control unit may execute stop mode using the timer spring after a preset amount of time has elapsed.

The water softener may be a water pressure regenerated type water softener.

The water softener may further include a resin tank unit comprising a plurality of resin tanks coupled to each other in parallel.

A resin tank inlet conduit may be connected to the inlet of the plurality of resin tanks coupled to each other in parallel, and the fluid flowing into the resin tank inlet conduit may be distributed to the plurality of resin tanks.

The water softener may further include a regeneration tank.

The regeneration tank may include a regeneration water outlet conduit through which regeneration water is discharged. The regeneration water outlet conduit may communicate with the resin tank inlet conduit. A separator unit may be placed between the regeneration water outlet conduit and the resin tank inlet conduit.

The separator unit may include a plurality of slits, which open towards the resin tank inlet conduit, and an axial channel in which the slits are located.

The regeneration tank may include a regeneration tank cap having a shaft, and a drain valve for drawing regeneration water from the regeneration tank. One end of the shaft may be connected to the regeneration tank cap, while a drain cap may be provided on the other end of the shaft. When the regeneration tank cap is closed, the drain cap closes the drain valve. However, when the regeneration tank cap is opened, the shaft is moved upwards by the shaft spring, so that the drain cap can open the drain valve.

The shaft may include a stopper. When the regeneration tank cap is opened, movement of the shaft can be stopped by the stopper after the spring-biased shaft has moved upwards a predetermined distance.

There may be three resin tanks and each of them may individually have a volume of not less than 0.5 L and an inner diameter of not larger than 9 cm.

The water softener may further include a regeneration tank inlet conduit which communicates with the regeneration tank at a first end thereof and with the timer control valve at a second end thereof. A flow controller may be provided on the regeneration tank inlet conduit to control the flow rate of water flowing into the regeneration tank when regeneration mode is selected.

When regeneration mode is selected, raw water flows into the regeneration tank inlet conduit and, after a preset amount of time has elapsed, regeneration mode returns to stop mode, so that the raw water is stopped from flowing into the regeneration tank inlet conduit.

The water softener may further include a soft water outlet conduit, which communicates with the resin tank unit at one end thereof, and an integrating flowmeter provided on the soft water outlet conduit.

The water softener may further include a filter unit and a filter unit inlet conduit communicating with the filter unit. When soft water mode is selected, the raw water supplied into the timer control valve flows into the filter unit inlet conduit, thereby being supplied to the filter unit.

The raw water supplied to the filter unit is filtered in the filter unit and flows into the resin tanks. In the resin tanks, the raw water is ion-exchanged by the ion exchange resin, thus producing soft water.

The water softener may further include a raw water outlet conduit communicating with the distribution conduit. The timer control valve may be operated in one of regeneration mode, soft water mode, stop mode and raw water mode. Further, when raw water mode is selected, raw water supplied to the timer control valve flows to the raw water outlet conduit and is distributed to the outside of the water softener through the distribution conduit.

The water softener may further include a raw water inlet conduit through which raw water is supplied to the timer control valve. The timer control valve may include a valve housing provided on the raw water inlet conduit, a lower valve body placed in the valve housing, an upper valve body rotatably placed on the lower valve body, an upper cap provided on the upper end of the valve housing, and a timer operated in conjunction with the valve housing.

A plurality of flow holes may be formed through the lower valve body. The flow holes may protrude upwards from the upper surface of the lower valve body, thus forming a valve step which is a gap between the upper valve body and the lower valve body.

The flow holes may include a soft water hole and a raw water hole each having a sectorial shape, and an arc-shaped regeneration hole formed around the center of the lower valve body.

The flow holes may be arranged such that the soft water hole, the raw water hole and the regeneration hole are sequentially arranged in a clockwise or counterclockwise direction.

The timer control valve may include a first gear combined with the timer, a connector connected to the upper end of the upper valve body, and a second gear connected to a shaft of the connector and engaging with the first gear.

The first gear may be connected to the timer spring and the timer spring may be loaded with a predetermined torque.

An inlet port may be formed through the upper valve body and may have a sectorial shape corresponding to the shape of both the soft water hole and the raw water hole.

Both the upper valve body and the lower valve body may be made of a ceramic material.

Advantageous Effects of Invention

The water softener according to the present invention is advantageous in that the water softener executes regeneration mode only for a time that has been preset by the timer, so that regeneration can be effectively executed and the amount of the regeneration agent used can be cut back on.

Further, the water softener of the present invention allows a user to effectively view the progress of operation mode and the progress of regeneration mode. Further, the water softener does not use electric signals, thus being free from electrical shorts and reducing the cost of installation.

Further, the water softener of the present invention uses a multi-tank type resin tank unit comprising a plurality of resin tanks, so that soft water at a temperature selected by a user can be quickly distributed to the user. Further, the water softener has a small size and can be easily installed in a location.

Further, in the water softener of the present invention, the regeneration tank cap can be easily opened and, at the same time, the regeneration tank cap can be simply opened by one motion without separately opening a drain valve, unlike conventional water softeners. Further, the present invention can prevent sudden removal of the regeneration tank cap, thus preventing users from being injured.

Further, in the water softener of the present invention, a constant amount of regeneration water can be supplied to the plurality of resin tanks, thus maintaining the amount of ion exchange resin in the resin tanks consistent and effectively producing soft water.

MODE FOR THE INVENTION

1. Construction of Water Softener

Figure 1:
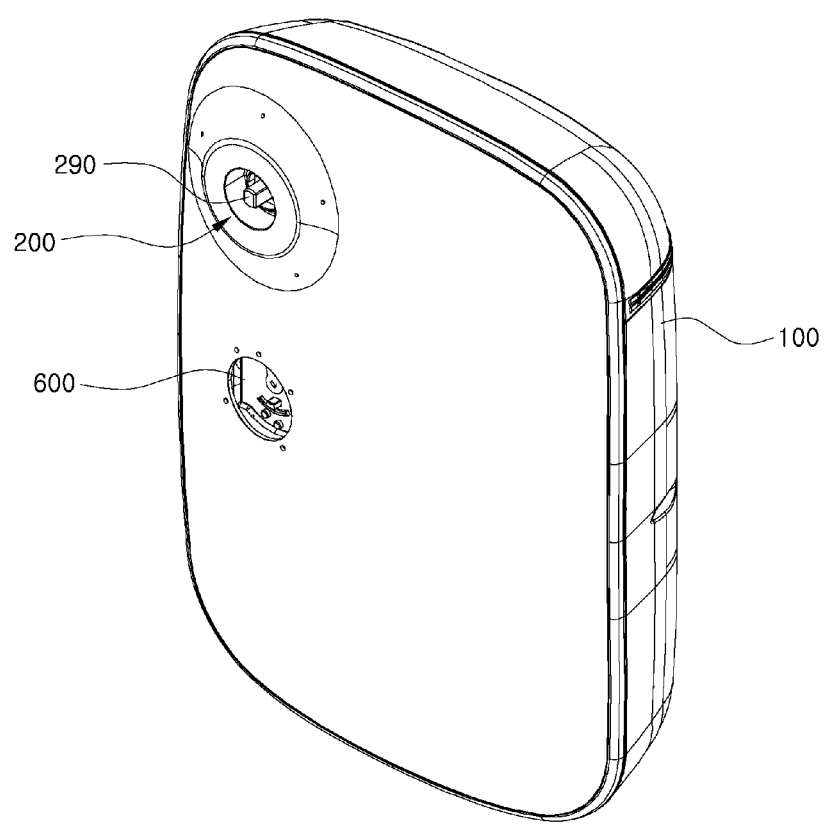
FIG. 1 is a perspective view illustrating the appearance of a water softener according to the present invention.
Figure 2:
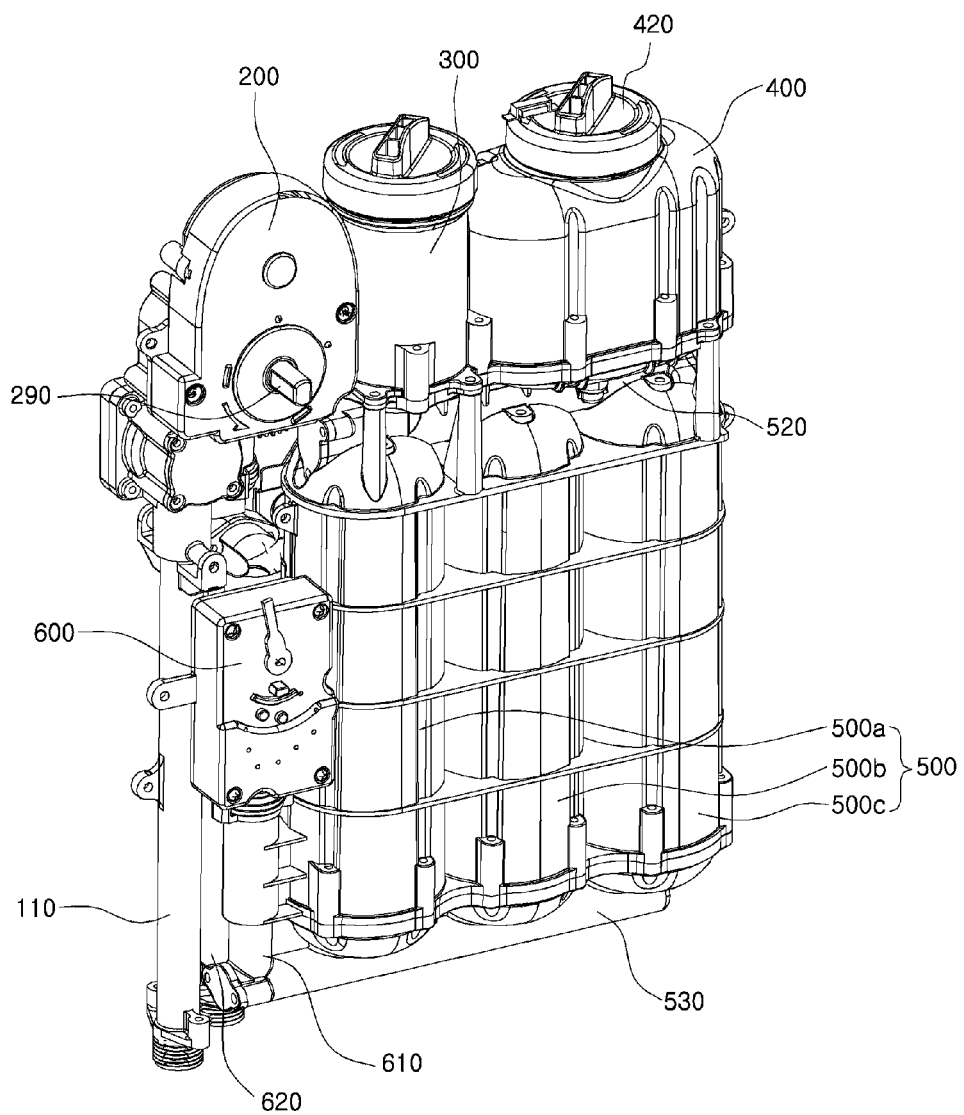
FIGS. 2 and 3 are perspective views of the water softener according to the present invention, from which an outer casing has been removed.
Figure 3:
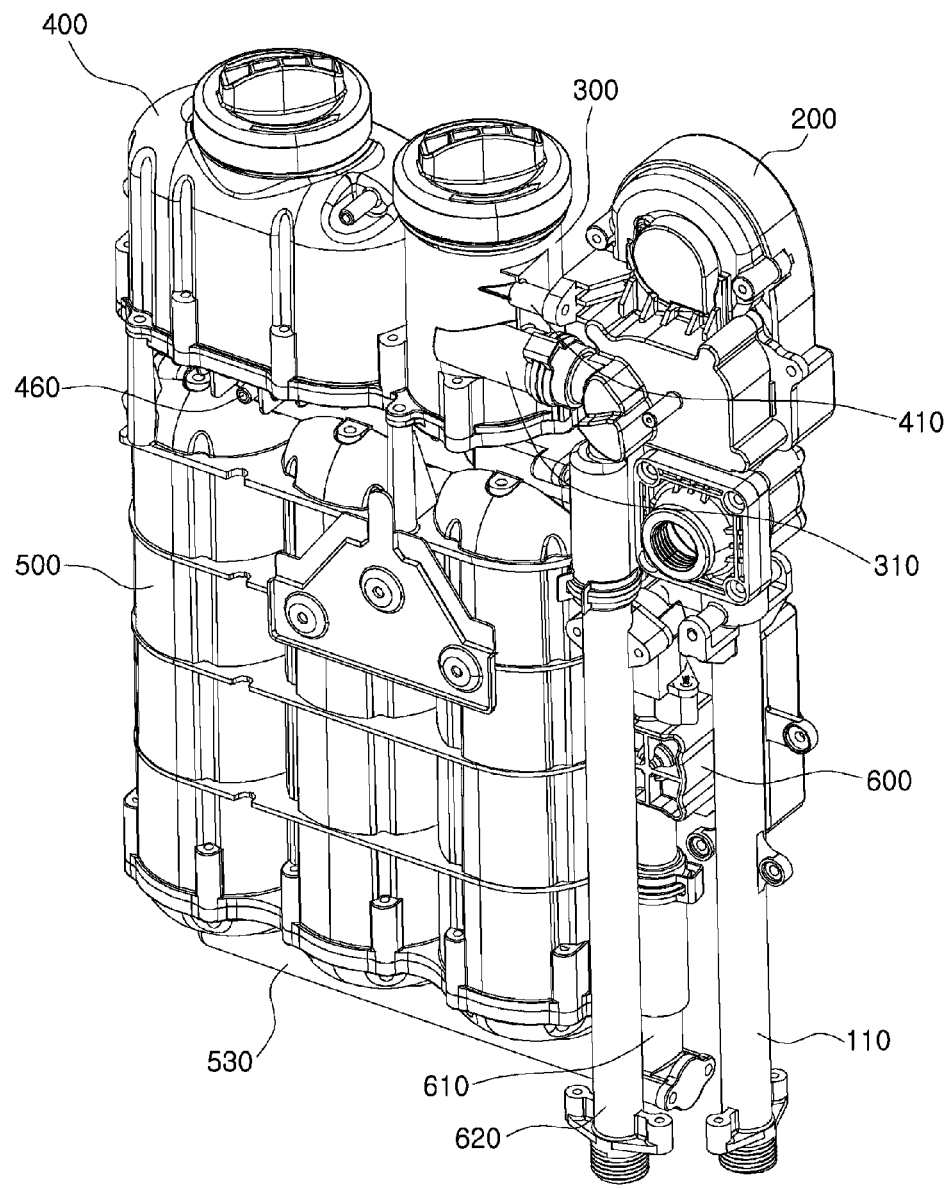
Figure 4:
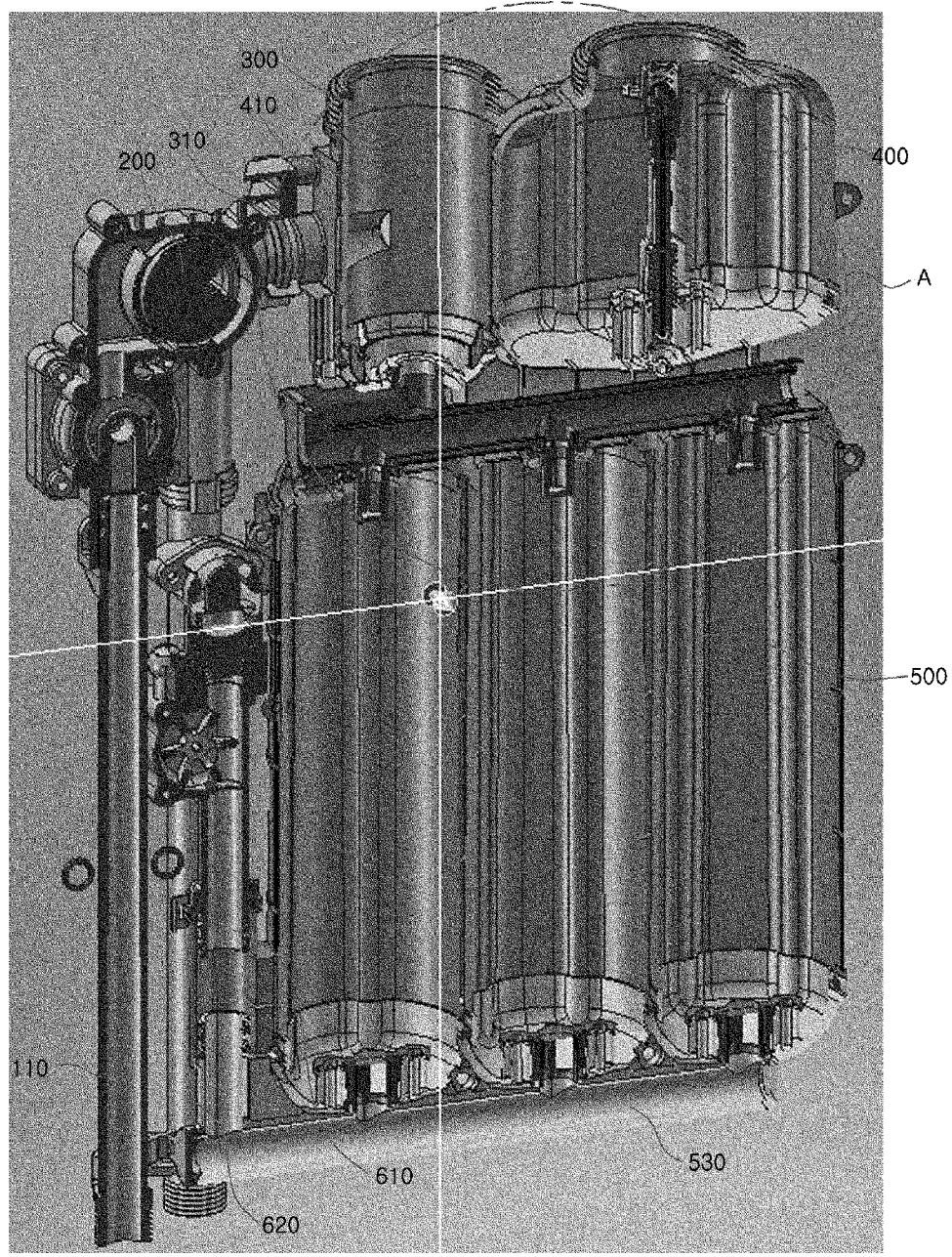
FIG. 4 is a sectional perspective view of the water softener according to the present invention.
Figure 5:
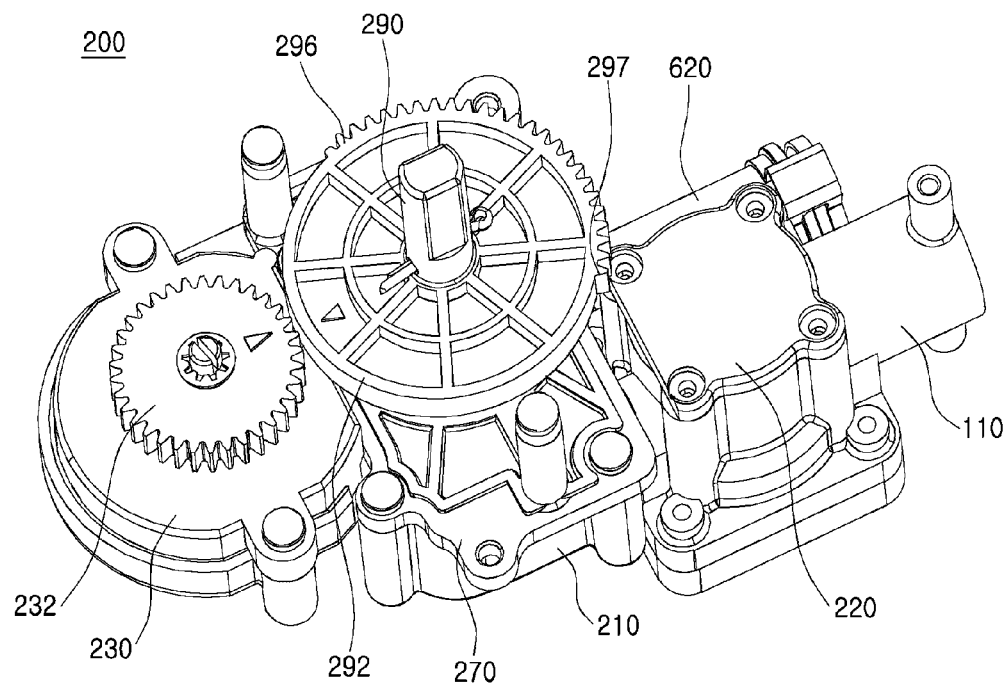
FIG. 5 is a top perspective view of a timer control valve included in the water softener according to the present invention.
Figure 6:
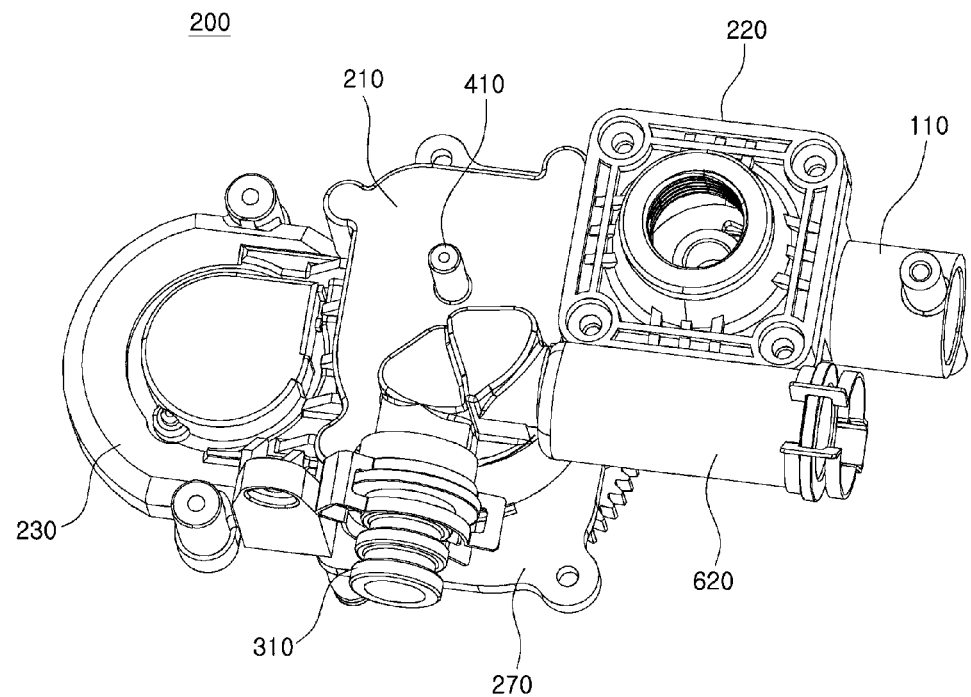
FIG. 6 is a bottom perspective view of the timer control valve of FIG. 5.
Figure 7:
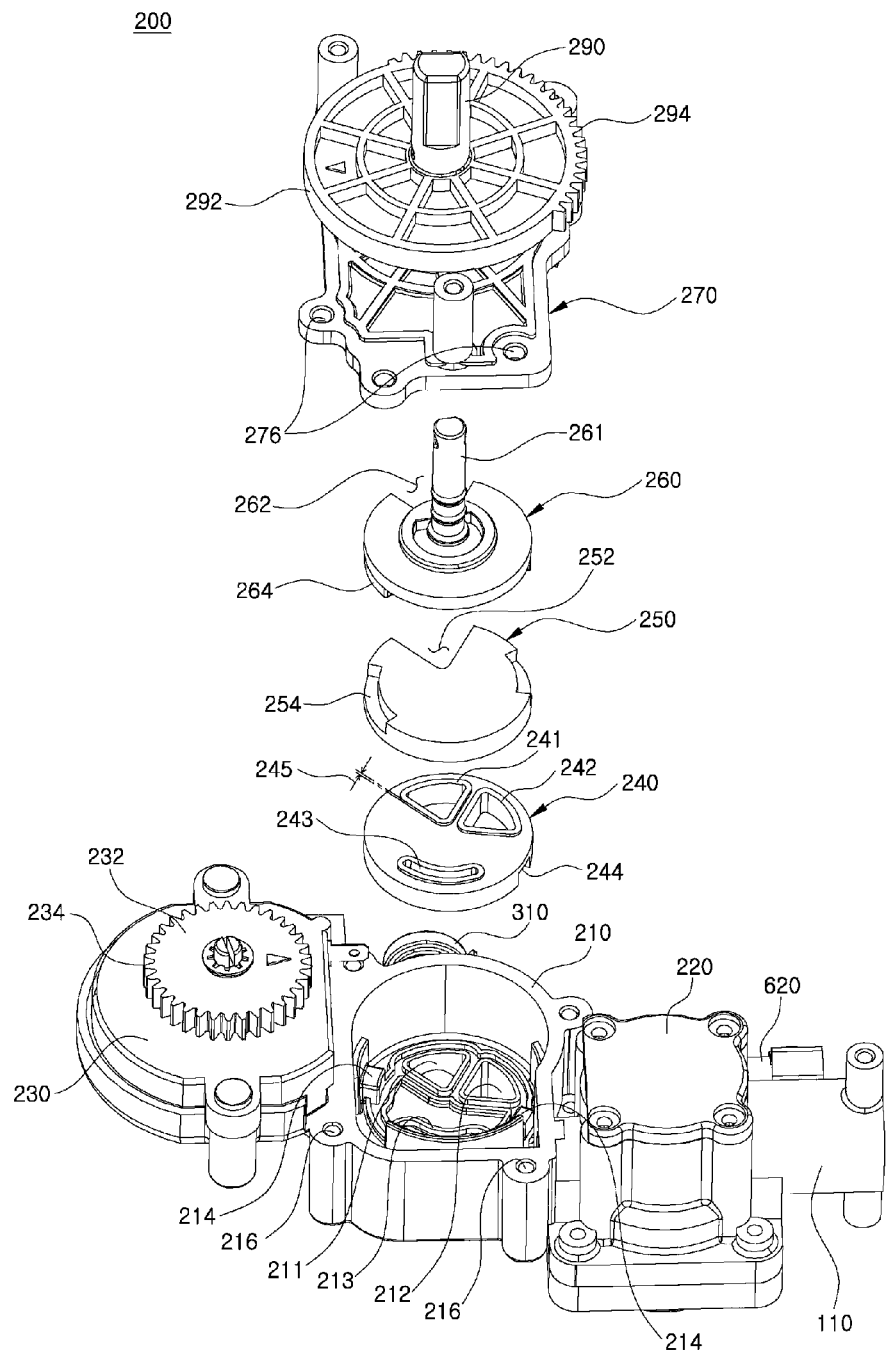
FIG. 7 is an exploded perspective view of the timer control valve of FIG. 5.

Hereinbelow, the construction of a water softener according to the present invention will be described with reference to FIG. 1 through FIG. 7. FIG. 1 through FIG. 3 are perspective views of the water softener according to the present invention. FIG. 4 is a sectional view of the water softener according to the present invention. FIG. 5 through FIG. 7 are perspective views of a timer control valve.

1.1 Schematic Description of Elements

FIG. 1 is a perspective view illustrating the appearance of the water softener according to the present invention. In FIG. 1, an outer casing 100, which covers and protects the internal elements of the water softener, a valve shaft 290 to which a user-operable valve control unit 295 (see FIG. 9) is attached, and an integrating flowmeter 600, which allows the user to view the amount of distributed soft water, are shown. The cover of the integrating flowmeter 600 is not shown in FIG. 1.

FIG. 2 through FIG. 4 are perspective views of the water softener according to the present invention, from which the outer casing 100 is omitted. FIG. 2 is a front perspective view, FIG. 3 is a rear perspective view, and FIG. 4 is a sectional perspective view, which is viewed from the same viewing direction as that of FIG. 2.

The water softener includes a timer control valve 200, a filter unit 300, a regeneration tank 400, a resin tank unit 500, and an integrating flowmeter 600.

The timer control valve 200 functions to guide the raw water, supplied from a water tap 10 through a raw water inlet conduit 110, to a conduit designated by the operation mode selected by a user. When the user selects the operation mode using the valve control unit 295, the timer control valve 200 guides the inlet raw water to one of a plurality of conduits, e.g. a raw water outlet conduit 120, a filter unit inlet conduit 310 and a regeneration tank inlet conduit 410, according to the selected operation mode. Operation modes of the water softener will be described later herein. In the present invention, a manual valve lever may be used as the valve control unit 295.

The filter unit 300 functions to filter the raw water flowing thereto through the filter unit inlet conduit 310. Filtered raw water flows into a resin tank through a resin tank inlet conduit 520.

The regeneration tank 400 stores a regeneration agent therein. A typical example of the regeneration agent is salt (NaCl). However, it should be understood that a different material may be used as the regeneration agent and that it is not restricted to salt. When raw water flows into the regeneration tank 400 through the regeneration tank inlet conduit 410, regeneration water is produced and the produced regeneration water is supplied to the resin tank through the resin tank inlet conduit 520.

The resin tank unit 500 includes a plurality of resin tanks 500a, 500b and 500c and stores an ion exchange resin therein.

When a user selects soft water mode, filtered raw water from the filter unit 300 is guided to the resin tank unit 500 through the resin tank inlet conduit 520. The inlet raw water in the resin tank unit 500 is subjected to an ion exchange process, so that hardness is removed from the raw water, thus producing soft water. The soft water is discharged from the resin tank unit 500 through a resin tank outlet conduit 530. Thereafter, the soft water is distributed to the user sequentially through a soft water outlet conduit 610 and a distribution conduit 620.

When a user selects regeneration mode, the regeneration water produced by the regeneration tank 400 can be fed to the resin tank unit 500 through the resin tank inlet conduit 520. The inlet regeneration water regenerates the ion exchange resin stored in the resin tank unit 500.

The integrating flowmeter 600 is installed on the soft water outlet conduit 610 and allows a user to easily view the amount of outlet soft water (see FIG. 1). Therefore, the user can be informed of the total amount of outlet soft water by viewing the integrating flowmeter 600 and can determine the time when regeneration mode, wherein the ion exchange resin is regenerated, begins.

1.2 Construction of Resin Tank Unit 500

The resin tank unit 500 is a multi-tank type unit comprising a plurality of resin tanks 500a, 500b and 500c coupled to each other in parallel. In the embodiment shown in the accompanying drawings, three resin tanks 500a, 500b and 500c are shown. However, it should be understood that the number of resin tanks in the present invention is not limited to three.

When raw water at a temperature selected by a user has been supplied from the water tap 10 to the water softener, which has one resin tank or a plurality of resin tanks coupled to each other in series, ion-exchanged soft water must proceed along a long flow path prior to being finally distributed to the user. An excessive amount of water stagnates in the flow path, so that an excessive amount of time is required to distribute the soft water at the temperature selected by the user.

When two or more resin tanks are coupled to each other in series, the length of the flow conduit through which the soft water flows prior to being distributed is reduced and easy control of the temperature of the soft water is realized. However, the resin tanks coupled to each other in series increase the size of the water softener, so that it is difficult to install the water softener.

In order to solve the above-mentioned problems, the resin tank unit 500 according to the present invention uses a plurality of resin tanks 500a, 500b and 500c coupled to each other in parallel. Due to the parallel coupling of the resin tanks, the length of the flow conduit through which the soft water flows prior to being distributed can be reduced, thus realizing easy control of the temperature of the soft water and solving the problems experienced with the installation of a large-sized water softener.

Particularly, when a plurality of resin tanks 500a, 500b and 500c are used, the sizes of the resin tanks 500a, 500b and 500c can be sequentially reduced and this sequentially reduces the amount of ion exchange resin stored in the respective resin tanks 500a, 500b and 500c. When the amount of ion exchange resin stored in a resin tank is excessively reduced, hardness of the raw water may not be completely removed.

Thus, the inventor of the present invention has executed a plurality of experiments and concluded that the amount of ion exchange resin must be equal to or larger than 0.5 liters. Even if the amount of ion exchange resin exceeds 0.5 liters, if the inner diameter of the resin tank is larger than 9 cm, hardness of the raw water may not be completely removed.

Thus, according to a preferred embodiment of the present invention, it is preferred that the resin tanks 500a, 500b and 500c be coupled to each other in parallel and the volume of each tank be larger than 0.5 liters, and the inner diameter of each tank does not exceed 9 cm.

1.3 Construction of Timer Control Valve 200

Hereinbelow, a timer control valve 200 according to an embodiment of the present invention will be described with reference to FIGS. 5 through FIG. 7. FIG. 5 is a top perspective view of the timer control valve included in the water softener according to the present invention. FIG. 6 is a bottom perspective view of the timer control valve of FIG. 5. FIG. 7 is an exploded perspective view of the timer control valve of FIG. 5.

The timer control valve 200 comprises a cylindrical valve housing 210, a pressure reducer 220 provided on one side of the valve housing 210 that reduces the pressure of raw water supplied thereto through the raw water inlet conduit 110, a timer 230 provided on the other side of the valve housing 210 that functions as a regeneration timer, a lower valve body 240 securely placed in a lower part inside the valve housing 210, an upper valve body 250 closely placed on the lower valve body 240 such that the upper valve body 250 can be rotated, a connector 260 connected to the upper valve body 250, an upper cap 270 mounted to the top of the valve housing 210, and a valve shaft 290 connected to a shaft 261 of the connector 260 such that the valve shaft 290 can be rotated.

The valve housing 210 sequentially receives therein the lower valve body 240, the upper valve body 250 and the connector 260. A plurality of outlet ports 211, 212 and 213 are formed in the bottom of the valve housing 210. The outlet ports 211, 212 and 213 comprise a soft water outlet port 211, a raw water outlet port 212 and a regeneration water outlet port 213. Raw water supplied from the water tap 10 into the timer control valve 200 through the raw water inlet conduit 110 primarily collects in the valve housing 210 and is, thereafter, fed so as to produce soft water, raw water or regeneration water through an associated outlet port 211, 212, 213 in relation to the position of the lower and upper valve bodies 240 and 250.

A timer spring (not shown) is installed in the timer 230 and is connected to a first gear 232 having first teeth 234. The timer spring may be designed such that it is loaded with a torque of 3.5 kgf·cm. When the timer spring is designed such that a constant torque is applied thereto, the first gear 232 can be rotated at a constant speed. The first gear 232 can be rotated by a restoring force of the timer spring which is wound around the first gear 232. The first gear 232 is engaged with a second gear 292 connected to the valve shaft 290. Here, the first and second gears 232 and 292 can engage with each other because of the first teeth 234 and second teeth 294.

The lower valve body 240 is a circular body having predetermined thickness and made of a ceramic material. A plurality of flow holes are formed through the lower valve body 240. The flow holes comprise a soft water hole 241, a raw water hole 242 and a regeneration hole 243. The soft water hole 241 and the raw water hole 242 may have a sectorial shape or a triangular shape formed around the center of the lower valve body 240. When compared to the circular shape of conventional flow holes, the sectorial or triangular shape of the flow holes of the present invention reduces the surface area of the lower valve body 240, thus realizing compactness of the lower valve body 240. In the present invention, the regeneration hole 243 may be formed as an arc-shaped hole having a predetermined width.

A first locking groove 244 is formed in a lower surface of the lower valve body 240 and is engaged with a first protrusion 214 formed in the valve housing 210, thus stably and securely holding the lower valve body 240 in the valve housing 210.

The upper valve body 250 is a circular ceramic body having predetermined thickness in the same manner as that described for the lower valve body 240. In the present invention, it is preferred that the lower and upper valve bodies 240 and 250 be made of a ceramic material such that friction between them can be minimized. An inlet port 252 is formed through the upper valve body 250. It is preferred that the inlet port 252 be formed as a triangular shape such that the inlet port 252 can correspond to the shape of the soft water hole 241 and the raw water hole 242. A second locking groove 254 is formed in the upper edge of the upper valve body 250 such that the upper valve body 250 can be connected to the connector 260.

The connector 260 connects the upper valve body 250 to the valve shaft 290. The connector 260 has the shaft 261 at the center thereof, with a downward extending second protrusion 264 formed on a lower edge of the connector 260. The second protrusion 264 is engaged with the second locking groove 254 so as to stably and securely hold the connector 260 on the upper valve body 250. The connector 260 is provided with a notch 262 corresponding to the inlet port 252 of the upper valve body 250.

A plurality of locking holes 276 are formed around the edge of the upper cap 270 such that the locking holes 276 correspond to locking holes 216 formed in the upper end of the valve housing 210. When the valve housing 210 is assembled with the upper cap 270, the interior of the valve housing 210 is sealed. However, to prevent water contained in the valve housing 210 from leaking, it is preferred that a sealing member (not shown) be placed between the valve housing 210 and the upper cap 270.

Hereinbelow, the structure configured to reduce the load between the upper valve body 250 and the lower valve body 240 that results from the pressure inside the valve housing 210 will be described with reference to FIG. 7. The soft water hole 241, the raw water hole 242 and the regeneration hole 243 of the lower valve body 240 protrude upwards from the upper surface of the lower valve body 240 by the height of a valve step 245. The valve step 245 is a gap between the upper valve body 250 and the lower valve body 240 and allows inlet raw water inside the valve housing 210 to flow into the gap between the lower and upper valve bodies 240 and 250, thus reducing the load.

In other words, the raw water introduced into the gap between the lower and upper valve bodies 240 and 250 executes a shock absorbing action and offsets the pressure, which acts upwards from the lower valve body 240 and downwards from the upper valve body 250. Owing to the action of the raw water introduced into the gap between the lower and upper valve bodies 240 and 250, the friction of the upper valve body 250 relative to the lower valve body 240 can be effectively offset, thus realizing rotation of the upper valve body 250 by a rotational force transmitted from the valve shaft 290.

2. Operation of the Water Softener

Figure 8:
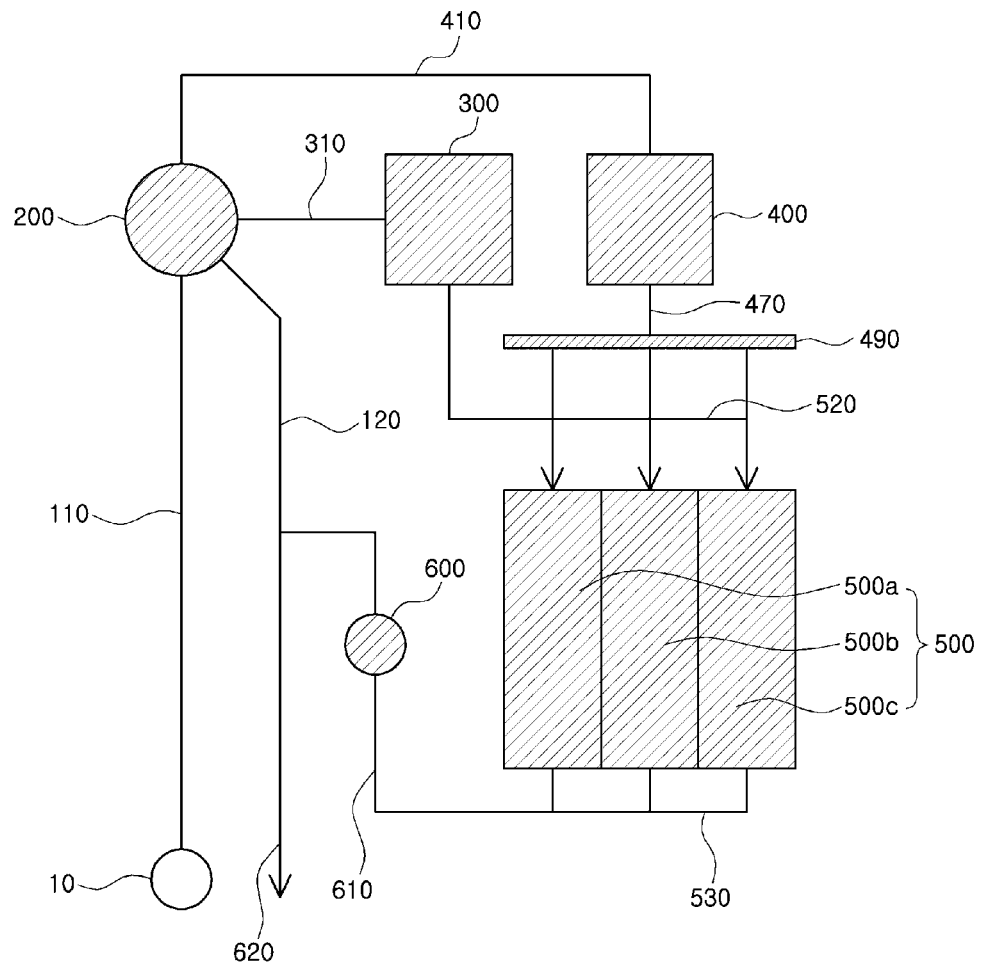
FIG. 8 is a schematic diagram illustrating the process of operating the water softener according to the present invention.
Figure 9:
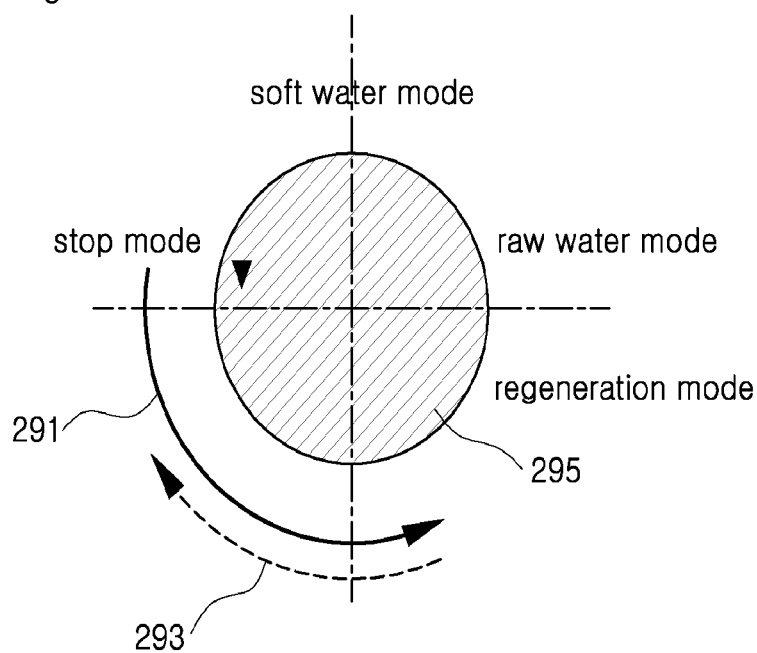
FIG. 9 is a schematic diagram illustrating operation of a valve control unit of the present invention.

Operation of the water softener according to the present invention will be described hereinbelow with reference to FIG. 8 and FIG. 9. FIG. 8 is a schematic view illustrating the process of operating the water softener according to the present invention. FIG. 9 is a schematic view illustrating the operation of the valve control unit 295 when selecting one of the operation modes.

As shown in FIG. 9, a user can select one of stop mode, soft water mode, raw water mode and regeneration mode by manipulating the valve control unit 295. When the valve control unit 295 is manipulated by a user, the valve shaft 290 is rotated, thus actuating the timer control valve 200 and designating the conduit into which the raw water is guided from the timer control valve 200.

2.1 Stop Mode

When a user selects stop mode by manipulating the valve control unit 295, no raw water is supplied from the water tap 10 to the timer control valve 200. FIG. 9 illustrates a state in which a user selects stop mode by manipulating the valve control unit 295.

2.2 Soft Water Mode

When a user selects soft water mode by manipulating the valve control unit 295, raw water supplied from the water tap 10 is converted into soft water prior to being distributed to the user.

When raw water is supplied to the timer control valve 200 from the water tap 10 through the raw water inlet conduit 110, the timer control valve 200 guides the raw water to the filter unit inlet conduit 310. In the filter unit 300, the raw water is filtered and the filtered raw water is, thereafter, evenly distributed to the respective resin tanks 500a, 500b and 500c through the resin tank inlet conduit 520.

In the resin tanks 500a, 500b and 500c coupled to each other in parallel, the raw water is ion-exchanged to produce soft water. In the above state, because the inlet raw water is ion-exchanged in resin tanks 500a, 500b and 500c into each of which about ⅓ of the raw water has been distributed, soft water can be quickly produced and the temperature of the water supplied from the water tap 10 can be maintained without remarkable change as the water passes through the resin tanks 500a, 500b and 500c. Therefore, it is easy to control the temperature of the outlet soft water.

The soft water discharged from the resin tanks 500a, 500b and 500c sequentially passes through the resin tank outlet conduit 530, the soft water outlet conduit 610 and the distribution conduit 620 prior to being distributed to the user. The integrating flowmeter 600 is installed on the soft water outlet conduit 610 and measures the total amount of outlet soft water.

2.3 Raw Water Mode

When a user selects soft water mode by manipulating the valve control unit 295, raw water supplied from the water tap 10 is directly distributed to the user.

When the raw water is supplied into the water softener from the water tap 10 through the raw water inlet conduit 110, the timer control valve 200 guides the raw water to the raw water outlet conduit 120 and, thereafter, the raw water is distributed to the user through the distribution conduit 620.

2.4 Regeneration Mode

When a user selects regeneration mode by manipulating the valve control unit 295, raw water supplied from the water tap 10 is used as regeneration water. Further, when regeneration mode is selected, the timer spring (not shown) having a structure similar to that of a typical watch spring is actuated and changes the operation mode into stop mode after a preset amount of time has elapsed.

When raw water is supplied from the water tap 10 through the raw water inlet conduit 110, the timer control valve 200 guides the raw water to the regeneration tank inlet conduit 410. Further, the timer in the above state is actuated at the same time and automatically stops the supply of raw water after the preset amount of time has elapsed.

For example, when the user rotates the valve control unit 295 in a counterclockwise direction (arrow 291) from stop mode to regeneration mode, the timer spring (not shown) installed in the timer control valve 200 starts operation. Due to the operation of the timer spring, the valve control unit 295 rotates slowly from regeneration mode to stop mode in a clockwise direction (arrow 293), so that, after the preset amount of time has elapsed, operation mode automatically returns to stop mode.

Thus, the user can visually confirm the state of progress of regeneration mode by viewing the rotated state of the valve control unit 295.

In an embodiment of the present invention, the angle between stop mode and regeneration mode may be set to 144° and the timer spring may be set such that regeneration mode automatically returns to stop mode after about 30 minutes has elapsed. However, it should be understood that the angle between the two modes and the automatic returning time to stop mode are not limited to the above-mentioned values.

The raw water flows into the regeneration tank 400 through the regeneration tank inlet conduit 410. In the present invention, a flow regulator (not shown) may be installed on the regeneration tank inlet conduit 410 to regulate putting raw water into the regeneration tank 400 such that only a preset amount of raw water can be supplied to the regeneration tank 400. In an embodiment, the preset amount of raw water to be supplied to the regeneration tank 400 may be set to 150 ml. However, it should be understood that the preset amount of raw water is not limited to the above-mentioned value.

Because the raw water flowing into the regeneration tank 400 is pressurized to a predetermined pressure, the regeneration agent contained in the regeneration tank 400 can be dissolved by the pressure, thus producing regeneration water.

The regeneration water is discharged from the regeneration tank 400 through the regeneration water outlet conduit 470 and is evenly distributed to manifolds of the resin tank inlet conduit 520 by a separator unit 490 to be evenly supplied into the respective resin tanks 500*a*, 500*b* and 500*c*. The separator unit 490 will be described in detail later.

In the resin tanks 500*a*, 500*b* and 500*c*, the regeneration water regenerates the ion exchange resin and, thereafter, is discharged from the resin tanks 500*a*, 500*b* and 500*c* by water pressure prior to being drained.

The above-mentioned process is continuously executed when in regeneration mode. Regeneration mode automatically returns to stop mode (in a direction of arrow 293) by the timer control valve 200 after a preset amount of time has elapsed. When regeneration mode has completely returned to stop mode, no raw water is further supplied, thus stopping the regeneration of the ion exchange resin.

3. Regeneration tank 400

Figure 10:
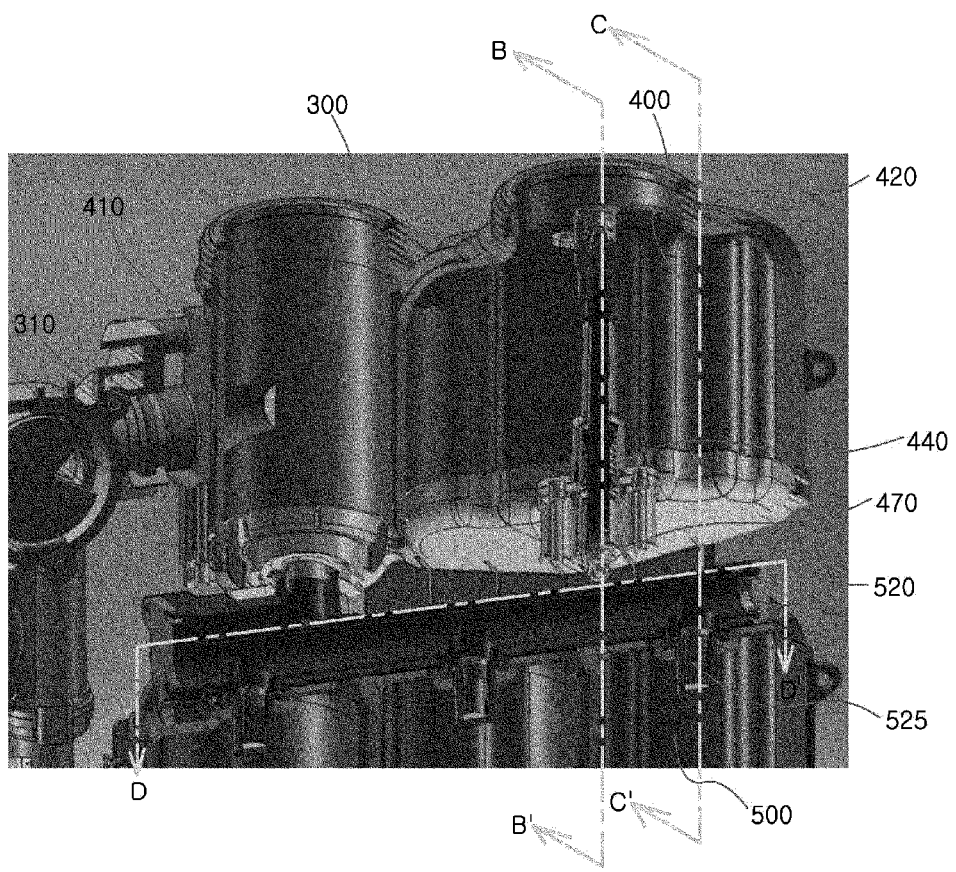
FIG. 10 is a detailed sectional perspective view of a regeneration tank according to the present invention shown by portion A of FIG. 4.
Figure 11:
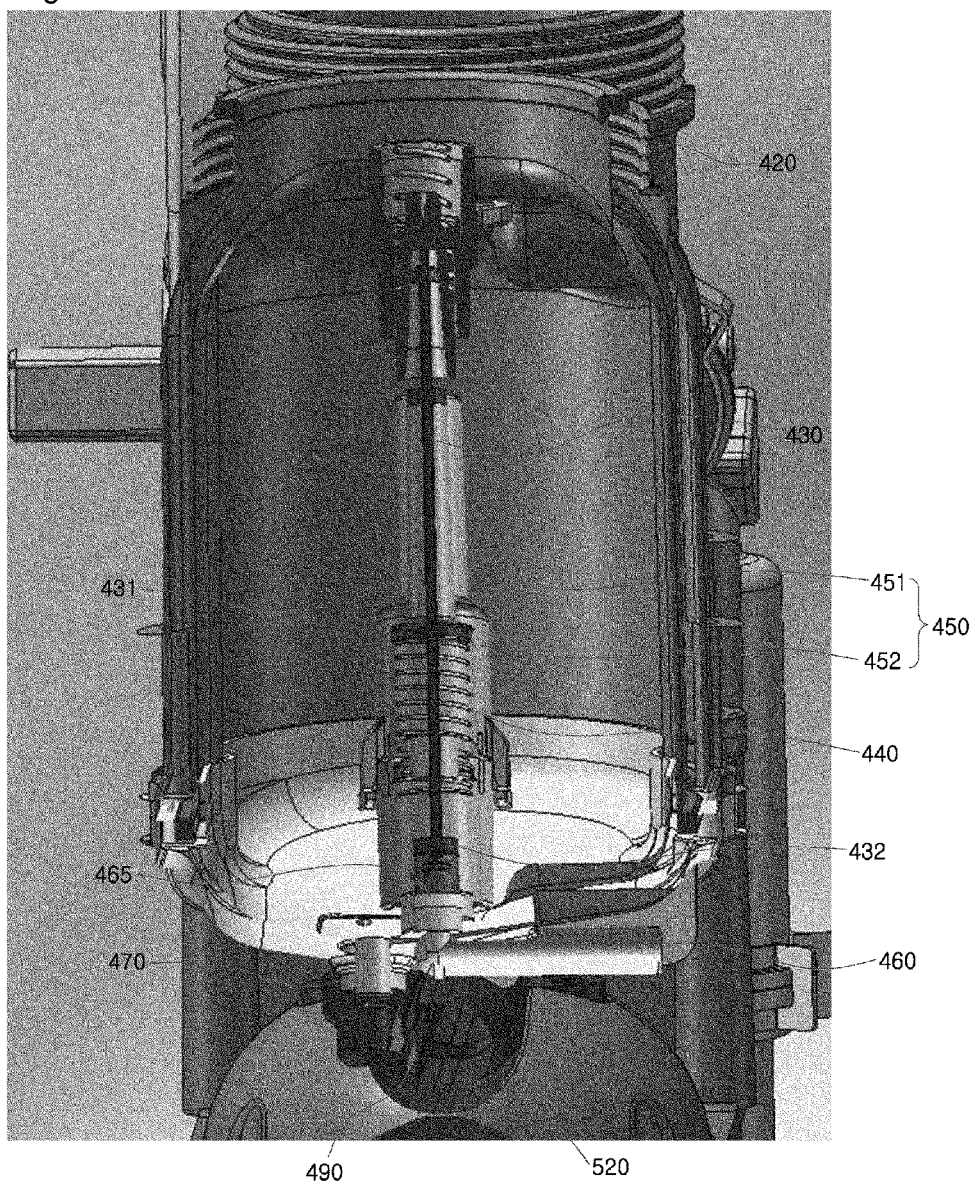
FIGS. 11 and 12 are sectional perspective views of the regeneration tank taken along lines B-B' and C-C' of FIG. 10, respectively.
Figure 12:
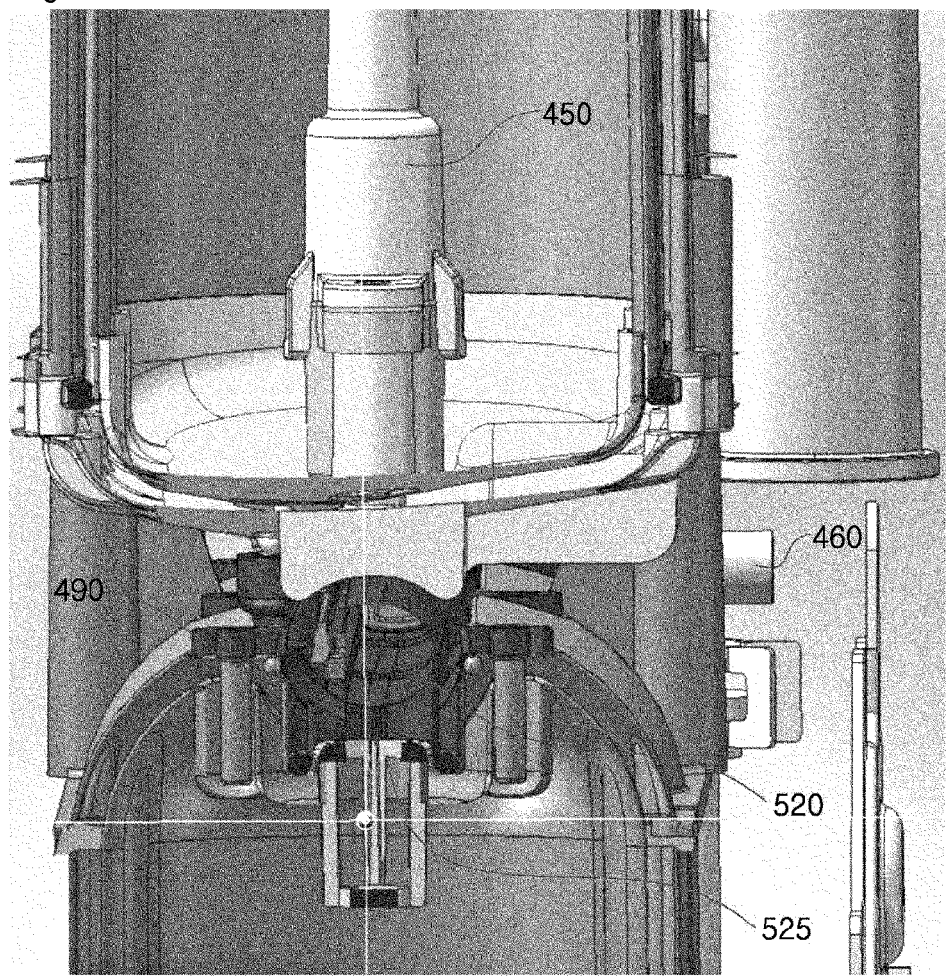
Figure 13:
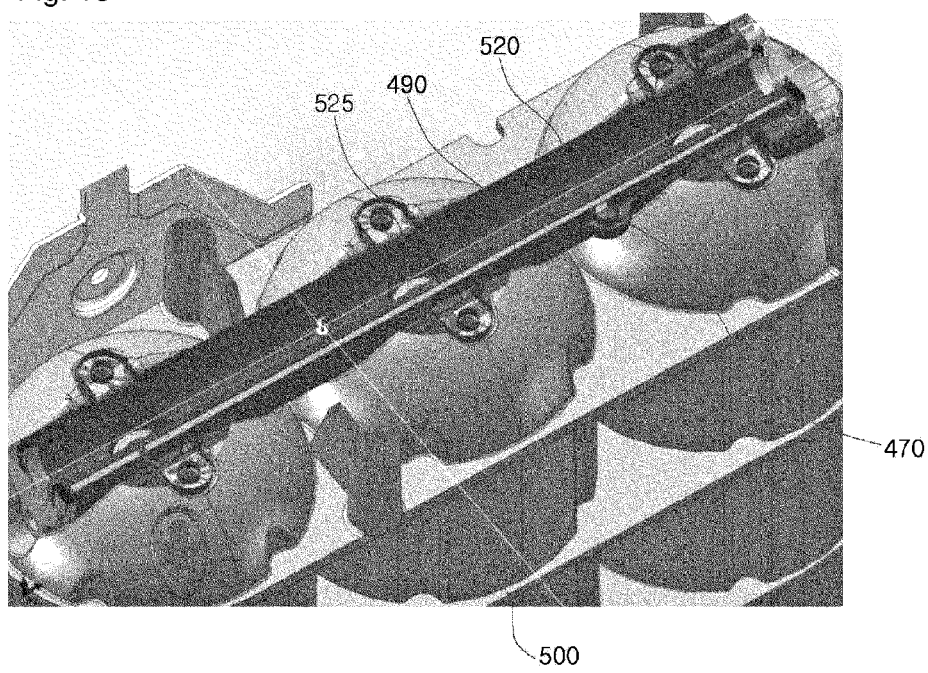
FIG. 13 is a sectional perspective view illustrating a separator unit according to the present invention taken along line D-D' of FIG. 10.
Figure 14:
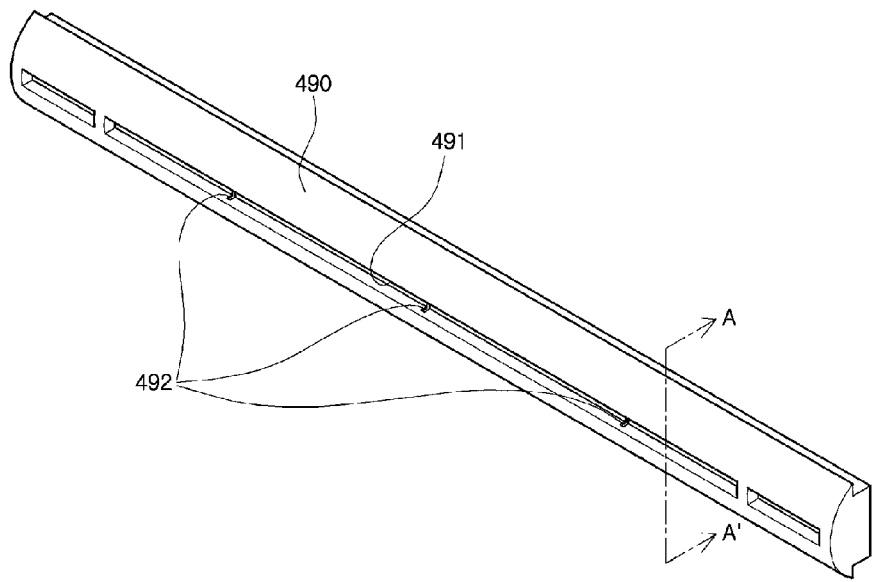
FIGS. 14a, 14b and 14c are a perspective view and sectional views of the separator unit according to the present invention.
Figure 14:
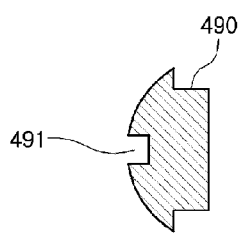
Figure 14:
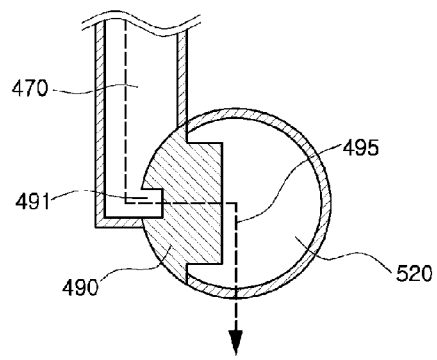

Hereinbelow, the regeneration tank 400 included in the water softener of the present invention will be described with reference to FIG. 10 through FIG. 14*c*. FIG. 10 is a detailed view of portion A of FIG. 4. FIG. 11 is a sectional perspective view taken along line B-B' of FIG. 10. FIG. 12 is a sectional perspective view taken along line C-C' of FIG. 10. FIG. 13 is a sectional perspective view taken along line D-D' of FIG. 10.

FIG. 14*a* is a perspective view of the separator unit 490. FIG. 14*b* is a sectional view of the separator unit 490. FIG. 14*c* is a sectional view illustrating the locked state of the separator unit 490 relative to the resin tank inlet conduit 520.

3.1 Shaft 430

The regeneration tank of the water pressure regenerated type water softener normally contains water, so that the interior of the regeneration tank is normally under a substantial amount of pressure. Therefore, when it is required to open the regeneration tank cap to charge the regeneration tank with regeneration agent, it is difficult to open the regeneration tank cap due to the pressure and, further, the cap may suddenly explode off and injure a user.

In an effort to solve the problem, a drain valve may be provided in the regeneration tank of a conventional water pressure regenerated type water softener. In the conventional water pressure regenerated type water softener, prior to opening the regeneration tank cap, a user must manipulate the drain valve so as to drain water from the regeneration tank.

The above-mentioned problem can be overcome by the water softener of the present invention as follows.

The regeneration tank 400 includes a shaft 430 connected to a regeneration tank cap 420.

A stopper 431 is provided on a middle portion of the shaft 430 and prevents the regeneration tank cap 420 from excessively moving upwards due to the restoring force of a shaft spring 440, as will be described later herein.

A drain cap 432 is provided on the lower end of the shaft 430. When the regeneration tank cap 420 is closed, the drain cap 432 automatically seals a drain hole 465 and prevents the regeneration water from being discharged from the regeneration tank 400 through a drain 460.

Further, when the regeneration tank cap 420 is opened, the shaft 430 moves upwards by the restorative force of the shaft spring 440, so that the drain cap 432 can move upwards, thus automatically opening the drain hole 465. Unlike conventional water pressure regenerated type water softeners, the water softener of the present invention does not require the additional process of opening a drain valve prior to opening the regeneration tank cap 420.

The shaft 430 is encased by a shaft housing 450. The shaft housing 450 includes an upper shaft housing 451 and a lower shaft housing 452 having a diameter larger than that of the upper shaft housing 451. Due to the above-mentioned construction, the stopper 431 of the shaft 430 can be stopped by the shaft housing 450, so that, when the regeneration tank cap 420 is opened, the regeneration tank cap 420 can be prevented from excessively moving or exploding off due to the restoring force of the shaft spring 440.

3.2 Separator Unit 490

As shown in FIGS. 11 through 13, the regeneration water inside the regeneration tank 400 can be discharged from the tank 400 through one regeneration water outlet conduit 470 and can be distributed to the respective resin tanks 500a, 500b and 500c through resin tank inlet conduits 520. In the above state, the regeneration water must be evenly distributed to the resin tanks 500a, 500b and 500c so that the ion exchange resin stored in the respective resin tanks can be regenerated in a constant manner and soft water can be effectively produced.

However, the regeneration water produced by the water pressure regenerated type water softener may be under high pressure, so that, when the regeneration water outlet conduit 470 is directly connected to the resin tank inlet conduit 520, a large amount of regeneration water may flow into the resin tank which is close to the regeneration water outlet conduit 470 and so has a higher regeneration water pressure, while a small amount of regeneration water may flow into another resin tank, which is far from the regeneration water outlet conduit 470 and has regeneration water at lower pressure.

To solve this problem, in the water softener of the present invention, a separator unit 490 is installed between the regeneration water outlet conduit 470 and the resin tank inlet conduit 520.

FIGS. 14a and 14b illustrate the shape of the separator unit 490 in a perspective view and a sectional view, respectively. The separator unit 490 is a long element and may be rounded on one axial surface (see FIG. 14c). Because the separator unit 490 is mounted to the resin tank inlet conduit 520, it is preferred that the round surface of the separator unit 490 have the same radius of curvature as that of the resin tank inlet conduit 520.

An axial channel 491 is formed along the round surface of the separator unit 490. The regeneration water, which has been supplied to the separator unit 490 through the regeneration water outlet conduit 470, temporarily collects in the axial channel 491 and is thereafter distributed to a plurality of slits 492. In the above process, the regeneration water that has temporarily collected in the axial channel 491 is under a constant amount of pressure, so that the pressure of the regeneration water distributed to the respective slits 492 is the same. Here, because the regeneration water passing through the slits 492 flows into the respective resin tanks 500a, 500b and 500c through the resin tank inlet conduit 520, a substantially equal amount of regeneration water can be distributed to the resin tanks 500a, 500b and 500c because of the water pressure being the same.

The inlet path of the regeneration water is shown by the arrow 495 in FIG. 14c.

4. Operation of timer control valve 200

Figure 15:
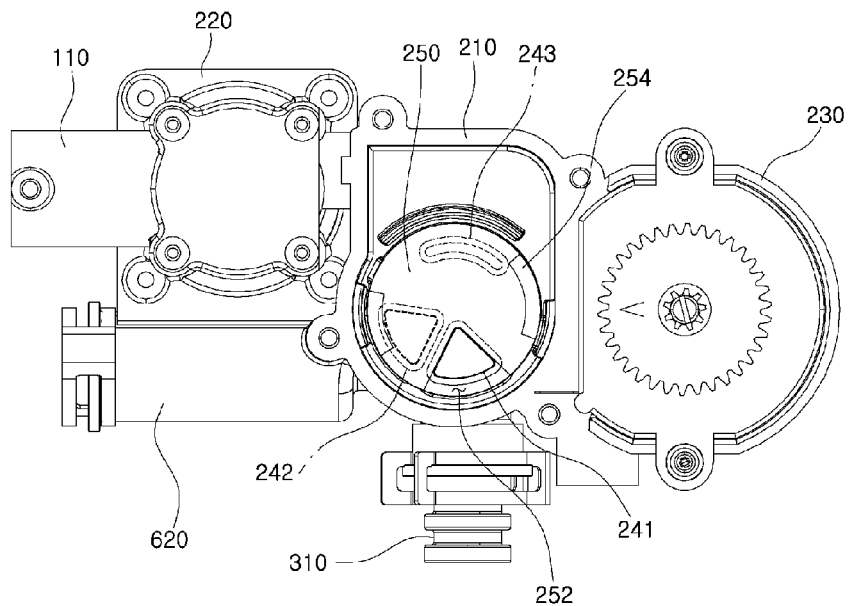
FIG. 15 is a view illustrating the relationship between an upper valve body and a lower valve body when the timer control valve of the present invention is in soft water mode.
Figure 16:
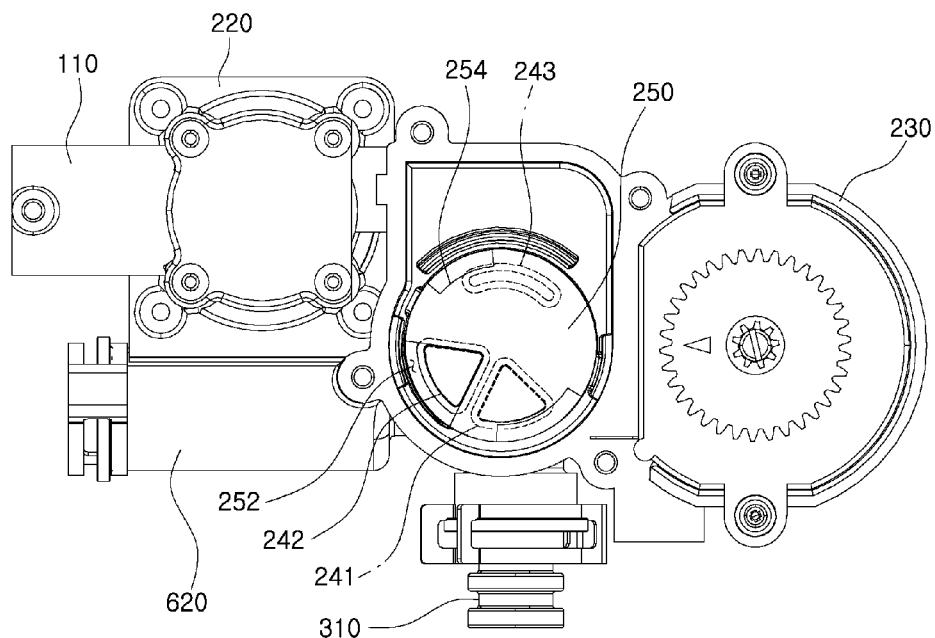
FIG. 16 is a view illustrating the relationship between the upper valve body and the lower valve body when the timer control valve of the present invention is in raw water mode.
Figure 17:
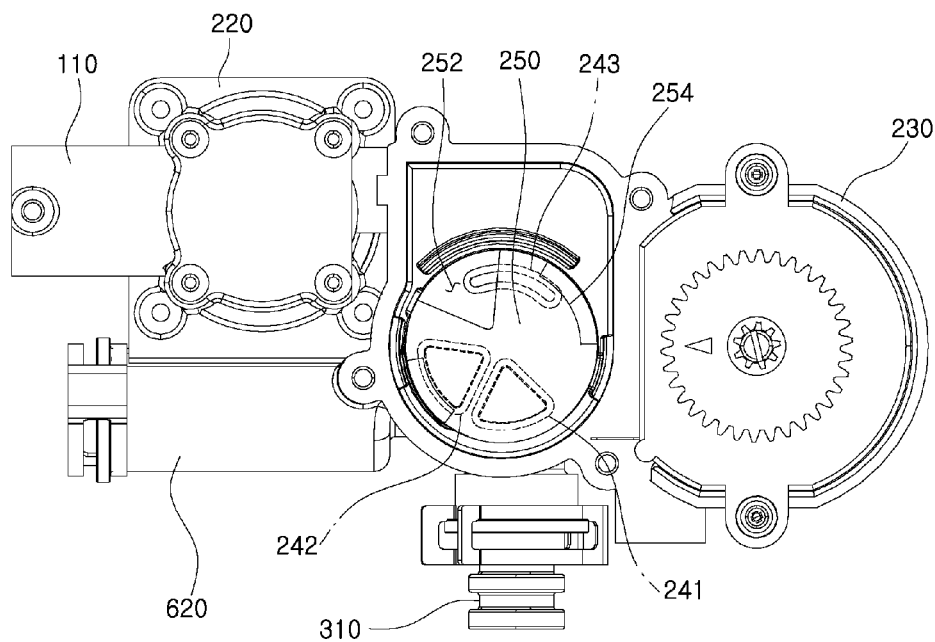
FIG. 17 is a view illustrating the relationship between the upper valve body and the lower valve body when the timer control valve of the present invention starts regeneration mode.
Figure 18:
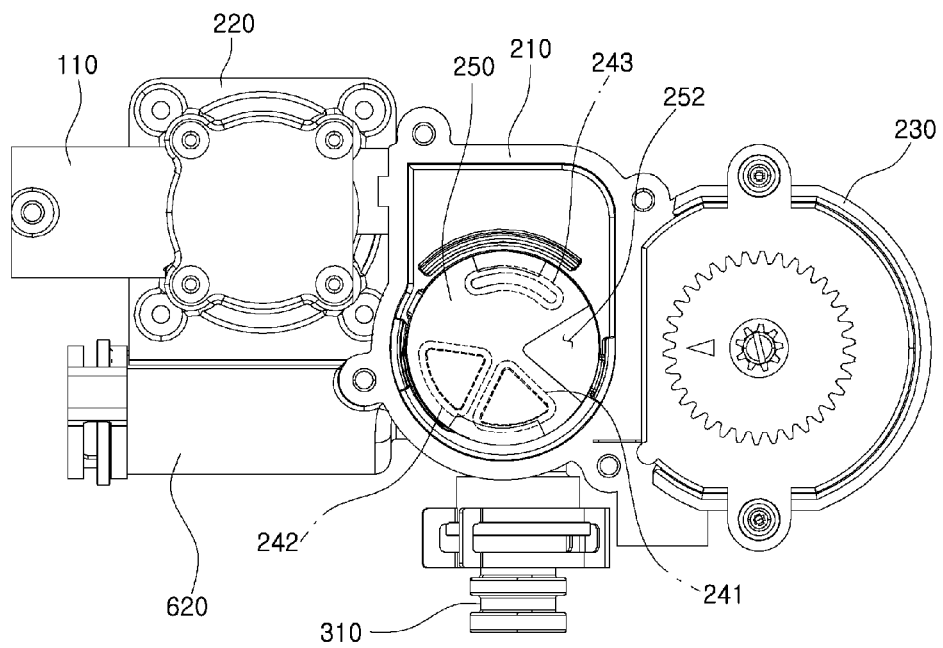
FIG. 18 is a view illustrating the relationship between the upper valve body and the lower valve body when the timer control valve of the present invention terminates regeneration mode.

FIG. 15 is a view illustrating the relationship between the upper valve body and the lower valve body in a state in which the timer control valve of the present invention has selected soft water mode. FIG. 16 is a view illustrating the relationship between the upper valve body and the lower valve body in a state in which the timer control valve has selected raw water mode. FIG. 17 is a view illustrating the relationship between the upper valve body and the lower valve body in a state in which regeneration has started. FIG. 18 is a view illustrating the relationship between the upper valve body and the lower valve body in a state in which the regeneration has been finished.

4.1 Change Between Flow Paths in Timer Control Valve 200

Hereinbelow, the change between flow paths in the timer control valve 200 according to variations in the location of the upper valve body 250 relative to the lower valve body 240 will be described with reference to FIG. 15 through FIG. 18.

First, the process of producing soft water using inlet raw water will be described with reference to FIG. 15.

In the process, the inlet port 252 of the upper valve body 250 is placed in alignment with the soft water hole 241 of the lower valve body 240. The above-mentioned location of the inlet port 252 can be realized by rotating the upper valve body 250. The upper valve body 250 works together with both the valve shaft 290 and the connector 260. In the above-mentioned relative location, both the raw water hole 242 and the regeneration hole 243 of the lower valve body 240 are closed, so that no water flows therethrough.

The flow sequence of water in soft water mode is as follows. Here, the mark — denotes the flow of water:

Water tap 10—raw water inlet conduit 110—valve housing 210—inlet port 252—soft water hole 241—soft water outlet port 211—filter unit inlet conduit 310—filter unit 300—resin tank unit 500—integrating flowmeter 600—distribution conduit 620

Second, the process of distributing inlet raw water to a user without producing soft water will be described with reference to FIG. 16.

In the process, the inlet port 252 of the upper valve body 250 is placed in alignment with a raw water hole 242 of the lower valve body 240. The above-mentioned location of the inlet port 252 can be realized by rotating the valve shaft 290 by a predetermined rotation angle in a clockwise or counterclockwise direction. In the above state, both the soft water hole 241 and the regeneration hole 243 of the lower valve body 240 are closed, so that no water flows to the resin tank unit 500 or to the regeneration tank 400.

The flow sequence of water in the raw water mode is as follows:

Water tap 10—raw water inlet conduit 110—valve housing 210—inlet port 252—raw water hole 242—raw water outlet port 212—distribution conduit 620

Hereinbelow, the process of regenerating the ion exchange resin using inlet raw water will be described with reference to FIG. 17 and FIG. 18. First, as shown in FIG. 17, the inlet port 252 of the upper valve body 250 opens a first part of the regeneration hole 243 of the lower valve body 240. In the above state, it is possible to preset the upper valve body 250 using the timer 230 such that the upper valve body 250 can be rotated in a clockwise direction for a predetermined regeneration time. Here, the regeneration time can be preset using the timer spring installed in the timer 230. In the present invention, for example, the restorative force of the timer spring may be preset such that the regeneration time can be set to 20 minutes. The restorative force of the timer spring can be transmitted to the upper valve body 250 by both the first gear 232 and the second gear 292. During the process, the first and second teeth 234 and 294 formed around the outer edges of the first and second gears 232 and 292 precisely engage with each other, thus realizing precise rotation of the gears 232 and 292. As shown in FIG. 18, when the timer 230 ceases to rotate the upper valve body 250, the inlet port 252 of the upper valve body 250 is located at a position between the regeneration hole 243 and the soft water hole 241 after passing over a second part of the regeneration hole 243.

The flow sequence of water in the regeneration mode is as follows:

The water tap 10—the raw water inlet conduit 110—the valve housing 210—the inlet port 252—the regeneration hole 241—the regeneration water outlet port 213—the regeneration tank inlet conduit 410—the regeneration tank 400—the resin tank inlet conduit 520—the resin tank unit 500—the resin tank outlet conduit 530—the distribution conduit 620.

4.2 Regeneration Process of Water Softener 1000 Executed by Timer Control Valve 200

When the integrating flowmeter 600 shows that the ion exchange resin must be regenerated during a process of producing soft water using raw water supplied from the resin tank unit 500, the user rotates the valve shaft 290 to start the regeneration process. To start the regeneration process, the user rotates the valve shaft 290 in a counterclockwise direction, thus bringing the second teeth 294 of the second gear 292 into engagement with the first teeth 234 of the first gear 232. Here, the second teeth 294 have both a first point 296, at which the second gear 292 initially engages with the first gear 232, and a second point 297 at which the second gear 292 completes its engagement with the first gear 232.

During the counterclockwise rotation of the first gear 232, the second gear 232 rotates in a clockwise direction from the first point 296 so that the timer spring of the timer 230 is contracted. Thereafter, the rotation of the valve shaft 290 is stopped before the first gear 232 passes over the second point 297. The above-mentioned process is a process preceding the execution of regeneration. Due to the restorative force of the contracted timer spring, both the first gear 232 and the second gear 292 can rotate, so that the upper valve body 250 can be rotated relative to the lower valve body 240 by a predetermined angle.

While the inlet port 252 of the upper valve body 250 passes over the regeneration hole 243 of the lower valve body 240, the regeneration process is continuously executed. When the inlet port 252 has completely passed the regeneration hole 243 and is not aligned with the regeneration hole 243, no raw water can pass through the regeneration hole 243 and the regeneration process stops.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A water softener system comprising:
    a water softener;
    a timer spring;
    a timer control valve that receives raw water therein and is rotatable by the timer spring;
    a raw water inlet conduit through which raw water is supplied to the timer control valve, the timer control valve including:
        a valve housing provided on the raw water inlet conduit,
        a lower valve body placed in the valve housing,
        an upper valve body rotatably placed on the lower valve body,
        an upper cap provided on an upper end of the valve housing, and
        a timer operated in conjunction with the valve housing; and
        a plurality of flow holes formed through the lower valve body, wherein the flow holes protrude upwards from an upper surface of the lower valve body, thus forming a valve step which is a gap between the upper valve body and the lower valve body,
    wherein each flow hole is selectively in fluid communication with the raw water inlet conduit, and
    wherein each flow hole is bounded by a protuberance spaced from other protuberances of the plurality of flow holes.

2. The water softener system as set forth in claim 1, wherein the timer control valve comprises a valve control unit operated using the timer spring, the timer control valve being operated in one of a regeneration mode, a soft water mode and a stop mode, wherein, when the regeneration mode is selected, the timer spring returns the valve control unit to the stop mode after a preset amount of time has elapsed.

3. The water softener system as set forth in claim 2, wherein the water softener further comprises:
    a raw water outlet conduit communicating with a distribution conduit, wherein
    the timer control valve is operated in one of the regeneration mode, the soft water mode, the stop mode and a raw water mode, and
    when the raw water mode is selected, raw water supplied to the timer control valve flows to the raw water outlet conduit and is distributed through the distribution conduit.

4. The water softener system as set forth in claim 1, further comprising:
    a resin tank unit including a plurality of resin tanks coupled to each other in parallel, a resin tank inlet conduit connected to inlets of the resin tanks coupled to each other in parallel, wherein a fluid, which has been supplied to the resin tank inlet conduit, is distributed to the resin tanks.

5. The water softener system as set forth in claim 4, further comprising:
    a regeneration tank, wherein the regeneration tank comprises a regeneration water outlet conduit for discharging regeneration water, wherein the regeneration water outlet conduit communicates with the resin tank inlet conduit, and a separator unit is provided between the regeneration water outlet conduit and the resin tank inlet conduit.

6. The water softener system as set forth in claim 5, wherein the separator unit comprises:
    a plurality of slits opening toward the resin tank inlet conduit; and
    an axial channel having the plurality of slits therein.

7. The water softener system as set forth in claim 5, wherein the regeneration tank comprises:
    a regeneration tank cap having a shaft; and
    a drain valve for draining the regeneration water, wherein the shaft is connected to the regeneration tank cap at a first end thereof and is provided with a drain cap at a second end thereof, and
    when the regeneration tank cap is closed, the drain cap closes the drain valve and, when the regeneration tank cap is opened, the shaft is moved upwards by a shaft spring, so that the drain cap opens the drain valve.

8. The water softener system as set forth in claim 7, wherein the shaft is provided with a stopper and, when the regeneration tank cap is opened, the shaft is moved upwards to a predetermined height by the shaft spring and is, thereafter, stopped by the stopper.

9. The water softener system as set forth in claim 5, wherein the water softener further comprises:
 a regeneration tank inlet conduit communicating with the regeneration tank at a first end thereof and communicating with the timer control valve at a second end thereof, wherein a flow controller is provided on the regeneration tank inlet conduit and, when a regeneration mode is selected, the flow controller controls a flow rate of the fluid flowing into the regeneration tank.

10. The water softener system as set forth in claim 9, wherein, when the regeneration mode is selected, raw water flows into the regeneration tank inlet conduit and, after a preset time has elapsed, a stop mode is selected, so that raw water is stopped from flowing into the regeneration tank inlet conduit.

11. The water softener system as set forth in claim 9, wherein the water softener further comprises:
 a soft water outlet conduit communicating with the resin tank unit at a first end thereof, wherein an integrating flowmeter is provided on the soft water outlet conduit.

12. The water softener system as set forth in claim 4, wherein the plurality of resin tanks comprise three resin tanks, and each of the resin tanks has a volume of not less than 0.5 L and an inner diameter of not larger than 9 cm.

13. The water softener system as set forth in claim 1, wherein the flow holes comprise a soft water hole and a raw water hole each having a sectorial shape, and an arc-shaped regeneration hole formed around a center of the lower valve body.

14. The water softener system as set forth in claim 13, wherein the flow holes are arranged such that the soft water hole, the raw water hole and the regeneration hole are sequentially arranged in a clockwise or counterclockwise direction.

15. The water softener system as set forth in claim 1, wherein the timer control valve comprises:
 a first gear combined with the timer;
 a connector connected to an upper end of the upper valve body; and
 a second gear connected to a shaft of the connector and engaging with the first gear.

16. The water softener system as set forth in claim 15, wherein the first gear is connected to the timer spring and the timer spring is loaded with a predetermined torque.

17. The water softener system as set forth in claim 1, further comprising:
 an inlet port formed through the upper valve body, the inlet port having a sectorial shape corresponding to the shape of both a soft water hole and a raw water hole which are formed in the lower value body.

18. The water softener system as set forth in claim 1, wherein the timer control valve comprises a timer having the timer spring installed therein; a first gear that can be rotated by a restoring force of the timer spring which is wound around the first gear; and a second gear connected to the valve shaft, while being engaged with the first gear, wherein the second gear rotates in one direction by a valve shaft and makes the first gear rotate through the restoring force of the timer spring, and, as a result, the timer control valve rotates routinely by the timer.

\* \* \* \* \*